2,731,461
17-HYDROXY COMPOUNDS OF THE STEROID SERIES

Heinrich Ruschig, Bad Soden am Taunus, and Werner Fritsch, Josef Schmidt-Thomé, and Werner Haede, Frankfurt am Main, Germany, assignors to Farbwerke Hoechst Aktiengesellschaft vormals Meister Lucius & Bruning, Frankfurt am Main Hochst, Germany, a German company No Drawing. Application November 24, 1953,
Serial No. 394,224

Claims priority, application Germany November 28, 1952

6 Claims. (Cl. 260—239.55)

The present invention relates to a method of preparing 17-hydroxy compounds of the steroid series and to new 20-acetylamines of said series; it is based on the observation that 17-hydroxy compounds of the steroid series can be prepared by reacting 20-ketimines of the steroid series with acylating agents, oxidizing the products of this reaction with organic peracids—i. e. in the non-saturated series, after preliminary hydrolysis and oxidation of the hydroxy groups thus formed to carbonyl groups—and finally treating the oxidation products with hydrolyzing agents. For compounds of the saturated series, for example, the reaction takes place according to the following scheme:

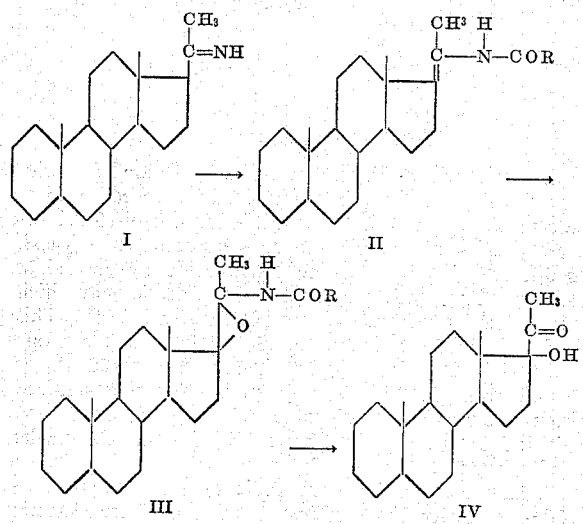

The conversion of the ketimines (I) into enacylamines (II) takes place under the influence of acylating agents.

Depending on the conditions of the reaction, one or two acid radicals may combine with the nitrogen atom. In the latter case, one of the two acyl radicals may be easily hydrolyzed. The enamino double bond may be between C17 and C20 or between C20 and C21, but the position between C17 and C20 is preferred.

The presence of substituents or double bonds in the sterol skeleton does not influence the course of the reaction. Hydroxy- or amino groups which may be present, are, of course, also acylated, carbonyl groups which might be present, are transformed into enolacylates.

The chemical properties of the enamino acylates obtained according to the present invention are fundamentally different from the properties of $\Delta^{17,20}$-enolacetates described by Gallagher. 20-enolacetates, even under mild conditions, are hydrolyzed, whereby the keto group is formed back again, whereas enamino acylates, if they contain two acyl groups, can be easily hydrolyzed, yielding monoacylenamines. Besides, acyl groups which may be contained in the nucleus of the sterol skeleton, can be split off partially from enamino acylates without destruction of the enamine structure. Thus, it is possible to hydrolyze partially acyloxy groups of the nucleus and to oxidize the secondary alcoholic groups thus obtained to carbonyl groups.

Besides, enolacetates and enamino acylates differ also in their reaction with halogens. Unsaturated enolacetates cannot be partially halogenated, but it is possible for example in the case of enamino diacylates to saturate the double bond in the $\Delta^5$-position with halogen without causing a reaction at the enamino double bond.

Addition of oxygen at the double bond between C17 and C20 of the enacylamines (II) is effected by means of peracids in known manner. If other double bonds which can also react with peracids, should be present in the nucleus, these are protected against this by a temporary addition of halogen. No protection is required in the case of $\Delta^4$-3-ketones. The epoxides (III) formed are treated with hydrolysing agents. This reaction gives 17-$\alpha$-hydroxypregnane derivatives (IV) and acid amides according to the equation. This new type of hydrolysis of the oxides is extremely surprising to the expert, as it is known that sterols which contain acylated nitrogen atoms are hydrolysed with extraordinary difficulty.

Thus, the method according to the present invention renders it possible to prepare 17-hydroxy compounds of the steroid series in a smooth reaction on an industrial scale. Substituents in the sterol nucleus, as for instance OH—, NH₂—, or oxo groups as well as double bonds do not interfere with the reaction in any way.

The 20-ketimino compounds used as starting material in the present invention can easily be prepared according to the methods described in the German Patents Nos. 693,351 and 713,193 respectively in our U. S. patent application Serial No. 294,055. Compounds which may be used as starting material are for example:

$\Delta^5$-pregnene-ol - (3) - (20) - ketimine, 3-formoxy-pregnene-(5)-(20)-ketimine, 3 - acetoxy-pregnane-(20)-ketimine, acetoxy-allo-pregnane-ketimine, 3,11 - dihydroxy-pregnene-(5)-(20)-ketimine, 3-acetoxy-11-oxopregnene-(5) - (20) - ketimine, 3,11-dioxopregnene-(4)-(20)-ketimine and similar compounds, also 7- or 12-hydroxy compounds obtained for example by the Curtius method for degradation of bile acids followed by a transposition of the amines thus obtained into ketimines by the methods described in the German patents mentioned hereinabove.

It is not necessary to start with pure ketimines in order to prepare acylated enamines. It is sufficient to transform 20-steroidamines into chloramines according to the method described in the above mentioned patents and to prepare the ketimines by splitting off hydrochloric acid from these chloramines by means of sodium alcoholate. The solvent can be separated from other parts of the reaction mixture by distillation under reduced pressure and the residue may be reacted directly with the acylating agents mentioned further below. But it is also possible to prepare the hydrochloride of the ketimine by passing hydrogen chloride into the reaction mixture while cooling and to liberate from this hydrochloride the ketimine by treatment with alkali alcoholate.

As acylating agents useful for the methods of the present invention, there may be concerned, for example: anhydrides of organic carboxylic acids such as benzoic acid anhydride, acetic anhydride, propionic anhydride and others; the anhydrides of aliphatic carboxylic acids of low molecular weight are particularly suitable for the reaction. Acid chlorides may also be used instead of the acid anhydrides. Besides, isopropenyl-acetate and keten are also suited for introducing the acetyl group.

As organic peracids there may be concerned: aromatic peracids such as perbenzoic acid, perphthalic acid, or saturated aliphatic peracids such as performic acid, per-acetic acid or persuccinic acid and similar ones. The peracids need not be used in the free state, they may be produced as intermediary substances during the reaction from the organic acids present by addition of peroxides, as for instance sodium peroxide or barium peroxide. Or a mixture of hydrogenperoxide and glacial acetic acid may be used.

As hydrolysing agents are preferably used dilute solutions of alkali hydroxides, for instance sodium hydroxide or potassium hydroxide.

The following examples serve to illustrate the invention, but they are not intended to limit it thereto.

EXAMPLE 1

(a) $\Delta^{17(20)}$-allo-pregnene-ol-(3)-acetylamino-(20)-acetate

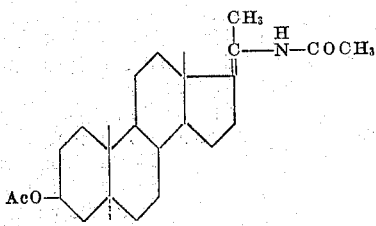

1.0 gm. of allo-pregnane-ol-(3)-chloramine-(20) is introduced into a solution of 550 mgms. of sodium in 42 cc. of absolute methanol and the reaction mixture is heated to boiling under reflux for 45 minutes. The excess of alcohol is then evaporated under reduced pressure and 15 cc. of acetic anhydride are carefully added while cooling to the residue which contains the crude allo-pregnane-ol-(3)-(20)-ketimine. When the reaction has ceased, the solution obtained is heated to boiling under reflux for 75 minutes. The product is further worked up and 1.03 gms. of a crude product are obtained of melting point 165° C.–170° C. (on the Kofler heater) (a mixture of cis-trans isomers). The substance can be further purified by recrystallization from cyclohexane.

(b) 17,20-oxydo-allo-pregnane-ol-(3)-acetylamino-(20)-acetate

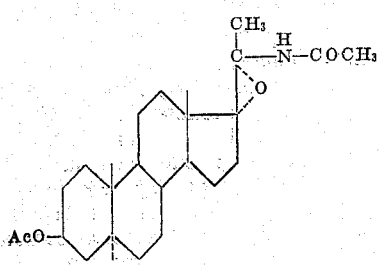

200 mgms. of $\Delta^{17(20)}$-allo-pregnene-ol-(3)-acetylamino-(20)-acetate are dissolved in a mixture of 16 cc. of benzene and 5 cc. of toluene, cooled to 0° C. and treated with 83 gms. of perbenzoic acid dissolved in 0.75 cc. of benzene. After standing for 35 minutes at 0° C., the product is diluted with ether, the ethereal solution is washed with a 5 per cent. sodium hydroxide solution and water, dried over sodium sulphate and evaporated to dryness under reduced pressure at a temperature not higher than 25° C., 135 mgms. of a crude product are obtained. By stirring with acetone, a portion of the oxide is obtained in a crystalline form. The melting point is 155° C.–160° C. (on the Kofler heater).

(c) 17-($\alpha$)-hydroxy-allo-pregnanolone 120 mgms. of 17,20-oxydo-allo-pregnane-ol-(3)-acetylamino-(20)-acetate (the crude product) are dissolved in 8 cc. of methanol, treated with 4 cc. of a 0.3 N solution of sodium hydroxide and are heated to boiling for 1 hour under reflux. The reaction mixture is then neutralized with acetic acid and carefully treated with water. A crystalline precipitate forms which is filtered with suction.

80 mgms. of a crude product are obtained with a melting point of 240° C.–250° C. (on the Kofler heater).

In order to purify the crude 17-($\alpha$)-hydroxy-allo-pregnanolone it is recrystallized from glacial acetic acid. The melting point is 254° C. (on the Kofler heater) (uncorr.). The melting point of a mixture of the product with standard 17-($\alpha$)-hydroxy-allo-pregnanolone is 254° C. (on the Kofler heater) (uncorr.).

EXAMPLE 2

(a) $\Delta^{5,17(20)}$-pregnadiene-ol-(3)-acetylamino-acetate 1.06 gms. of $\Delta^5$-pregnene-ol-(3)-one-(20)-ketimine are dissolved in 20 cc. of pyridine. After treatment with 7.5 cc. of acetic anhydride, the mixture is left to stand for 16 hours at room temperature. The reaction mixture is then mixed with ice water while stirring and allowed to stand for some time. A precipitate forms which is filtered with suction, dried at 70° C. and recrystallized from cyclohexane. Yield: 750 mgms. Melting point 149° C.–153° C. (on the Kofler heater).

The product can also be purified by distillation under greatly reduced pressure at 210° C.–220° C./10$^{-3}$ mm. The ultra-red absorption spectrum shows bands at 2.94$\mu$ and at 3.05$\mu$, which are characteristic for the NH—COCH$_3$ group.

(b) $\Delta^{5,17(20)}$-pregnadiene-ol-(3)-diacetylamino-(20)-acetate

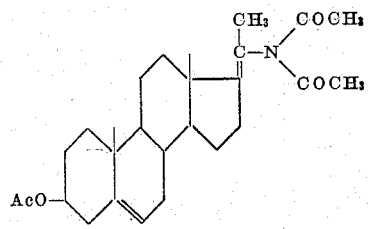

1. The reaction mixture, obtained by action of a solution of 2.57 gms. of sodium dissolved in 195 cc. of absolute alcohol upon 4.69 gms. of $\Delta^5$-pregnene-ol-(3)-chloramino-(20)-acetate, followed by evaporation to dryness, is dissolved in 68 cc. of acetic anhydride and heated to boiling. The acetic acid ester and the acetic acid which have been formed are then completely distilled off. This is followed by heating to boiling under reflux for one hour. The reaction mixture is further worked up as described in (a). The crude product is recrystallized from a few cc. of cyclohexane and then from methanol. Yield: 3.2 gms. Melting point: 179° C.–182° C. (on the Kofler heater).

2. 2.5 gms. of $\Delta^{5,17(20)}$-pregnadiene-ol-(3)-acetylamino-(20)-acetate are dissolved in a mixture of 25 cc. of acetic anhydride, 25 cc. of isopropenylacetate and 1.25 gms. of p-toluene sulphonic acid and heated to boiling under reflux for 3 hours. The reaction mixture is allowed to cool, poured into ice water, stirred for three hours and extracted with ether. After washing with a solution of sodium bicarbonate and with water, the ether extract is dried over sodium sulphate and evaporated to dryness under reduced pressure. The crude product thus obtained is purified by chromatography with acid aluminum oxide. The elutions with benzene petroleum ether (1:3) yield 850 mgms. of $\Delta^{5,17(20)}$-pregnadiene-ol-(3)-diacetylamino-(20)-acetate, which can be recrystallized from methanol. The melting point is 151° C.–153° C. (on the Kofler heater).

The differences with regard to the melting points in the products obtained according to (b)1 and (b)2 are apparently due to a cis-trans isomery.

(c) 5,6 - dibromo-$\Delta^{17(20)}$-pregnene-ol-(3)-diacetyl-amino-(20)-acetate 442 mgms. of $\Delta^{5,17(20)}$-pregnadiene-ol-(3)-diacetylamino-(20)-acetate and 140 mgms. of anhydrous sodium acetate are dissolved in 10 cc. of glacial acetic acid. A solution of 160 mgms. of bromine in 2.5 cc. of glacial acetic acid is added dropwise with stirring. After several minutes, the reaction mixture is mixed with 100 cc. of water while stirring, the precipitate which forms is filtered with suction, washed thoroughly with water, dissolved in cold acetone and the acetone solution is carefully treated with water. Crystals of the dibromide separate which are filtered with suction. Yield: 400 mgms. Melting point: 180° C.–196° C. (with decomposition) (on the Kofler heater).

(d) $\Delta^{5,17(20)}$-pregnadiene-ol-(3)-acetylamine-(20)

1. A solution of 280 mgms. of $\Delta^{5,17(20)}$-pregnadiene-ol-(3)-acetylamino-(20)-acetate in 10 cc. of methanol is mixed with a solution of 130 mgms. of potassium carbonate in 2.2 cc. of water and heated to boiling under reflux for 105 minutes. When cold, the solution is poured into water, the flakes which separate are filtered with suction and dried. They are purified by recrystallization from large amounts of acetone. Yield: 190 mgms. Melting point: 240° C.–260° C. (with decomposition) (on the Kofler heater).

2. A solution of 500 mgms. of $\Delta^{5,17(20)}$-pregnadiene-ol-(3)-diacetylamino-(20)-acetate in 18 cc. of methanol is treated with a solution of 400 mgms. of potassium bicarbonate in 4.5 cc. of water and heated to boiling under reflux for 90 minutes. The product is further worked up in an analogous manner as described in (d)1. Yield: 240 mgms. Melting point: 250° C.–270° C. (with decomposition) (on the Kofler heater).

(e) $\Delta^{4,17(20)}$-pregnadiene-one-(3)-acetylamine-(20)

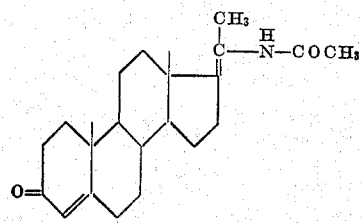

400 mgms. of $\Delta^{5,17(20)}$-pregnadiene-ol-(3)-acetylamine-(20) are dissolved in 90 cc. of hot toluene, treated with 23 cc. of cyclohexanone and about 12 cc. of the mixture are distilled off. After addition of a solution of 800 mgms. of aluminum-isopropylate in 5 cc. of toluene, the mixture is heated to boiling under reflux for 130 minutes. After 0.3 cc. of glacial acetic acid in 3 cc. of toluene have been added, the reaction mixture is steam distilled for 2 hours. Finally it is extracted with ether, the ethereal layer is washed with water, dried over sodium sulphate and evaporated to dryness under reduced pressure. The crude product is dissolved in a few cc. of acetone, and crystallized by carefully adding some petroleum ether. Yield: 300 mgms. Melting point: 173° C.–180° C. (on the Kofler heater) (mixture of cis-trans isomers).

$[\alpha]_D^{20} = +99° \pm 4°$ (ethanol).

(f) 17,20-oxydo-$\Delta^4$-pregnene-one-(3)-acetylamine - (20)

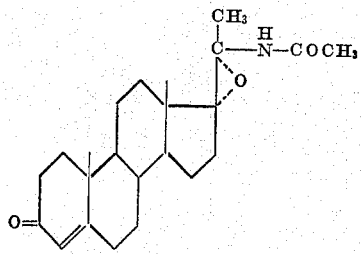

260 mgms. of $\Delta^{4,17(20)}$-pregnadiene-one-(3)-acetylamine-(20) are dissolved in a mixture of 20 cc. of benzene and 6 cc. of toluene, cooled to 0° C. and treated with 113 mgms. of perbenzoic acid, dissolved in 0.81 cc. of benzene. After standing for 100 minutes at 0° C., the product is diluted with ether, the ethereal solution is washed with a 5 per cent. sodium hydroxide solution and with water, dried over sodium sulphate and evaporated to dryness under reduced pressure at a temperature not higher than 25° C. The crude product is ground with a few cc. of acetone whereby crystallization takes place. Yield: 124 mgms. Melting point: 146° C.–149° C. (with decomposition) (in a copper block).

(g) 17($\alpha$)-hydroxy-progesterone 1. 100 mgms. of 17,20-oxydo-$\Delta^4$-pregnene-one-(3)-acetylamine-(20) are suspended in 12 cc. of methanol, treated with 3 cc. of a solution of 0.3 N sodium hydroxide and heated to boiling in a nitrogen atmosphere under reflux for one hour, whereby already after a few minutes all substances dissolve. The product is then neutralized with acetic acid and the alcohol is evaporated under reduced pressure. Crystals separate, which are filtered with suction, washed with water and recrystallized from a few cc. of acetone. Yield: 64 mgms. Melting point: 205° C.–209° C. (in a copper block) (uncorr.). The melting point of a mixture of this product with standard 17-($\alpha$)-hydroxyprogresterone is 205° C.–209° C. (in a copper block) (uncorr.).

2. 270 mgms. of 17,20-oxydo-$\Delta^4$-pregnenone-(3)-acetylamine-(20) are suspended in 34 cc. of methanol, treated with 16.8 cc. of a 0.3 N solution of sodium hydroxide and heated to boiling in a nitrogen atmosphere under reflux for one hour. The product is further worked up as described above in 1. 212 mgms. of 17-($\alpha$)-hydroxy-progesterone with a melting point of 205° C.–209° C. (in a copper block) are obtained (uncorr.).

The $\Delta^5$-pregnene-ol-(3)-(20)ketimine used as starting material can be obtained in the following way: 1.65 gms. of $\Delta^5$-pregnene-ol-(3)-chloramino-(20)-acetate are suspended in a solution of 0.9 gm. of sodium in 68 cc. of absolute alcohol and heated to boiling under reflux for 40 minutes. After the reaction mixture has cooled, dry hydrogen chloride gas is passed in until the mixture shows an acid reaction to Congo red. This is followed by an introduction of a solution of sodium ethylate until the reaction is alkaline. The product is evaporated to dryness under reduced pressure in a nitrogen atmosphere, the solid residue boiled with 100 cc. of benzene, the benzene solution filtered with suction while still hot and again evaporated to dryness under reduced pressure in a nitrogen atmosphere. Yield: 1.16 gms. of $\Delta^5$-pregnene-ol-(3)-(20)-ketimine. Melting point: 178° C. (on the Kofler heater).

If 20-amines are used as starting material instead of pure 20-ketimines, the enacetylamine described in (a) can be prepared without isolation of the ketimine as follows: 4.69 gms. of $\Delta^5$-pregnene-ol-(3)-chloramino-(20)-acetate are introduced into a solution of 2.57 gms. of sodium in 195 cc. of absolute alcohol and the reaction mixture is heated to boiling under reflux for 40 minutes. The excess of alcohol is then evaporated under reduced pressure and 68 cc. of acetic anhydride are added carefully to the residue, while cooling. When the reaction has ceased, the solution obtained by this reaction is heated to boiling under reflux for one hour. After cooling, sodium acetate and sodium chloride crystallize out which are filtered off from the remaining liquid by suction. The filtrate is evaporated to dryness under reduced pressure. The crystals on the filter are dissolved in 350 cc. of water and mixed with a solution of the evaporation residue in 30 cc. of alcohol while stirring. A precipitate forms which, after standing for some time, is filtered with suction, washed with water and dried under reduced pressure at 70° C. The crude product is obtained in form of a powder and is recrystallized from hot cyclohexane. Yield: 2.8 gms. Melting point: 150° C.–152° C.

We claim:
1. A process for preparing 17-hydroxy compounds of the steroid series, which comprises acylating 3-hydroxy-20-ketimines of the pregnene series by means of a member selected from the group consisting of carboxylic acid chlorides and anhydrides, partially hydrolyzing the reaction products by means of alkaline reagents, converting the hydrolysis products into the 17,20-oxido-compounds by means of organic peracids and hydrolyzing said oxido-compounds by means of dilute alkaline solutions.

2. A process for preparing 17-hydroxy compounds of the steroid series, which comprises acylating 3-hydroxy-20-ketimines of the pregnene series by means of a member selected from the group consisting of carboxylic acid chlorides and anhydrides, partially hydrolyzing the reaction products by means of alkaline reagents, oxidizing the hydrolysis products according to the Oppenauer process to form the 3-oxo-compounds, converting said oxo-compounds into the 3-oxo-17,20-oxido-compounds by means of organic peracids and hydrolyzing said oxido-compounds by means of dilute alkaline solutions.

3. A process for preparing 17-hydroxy compounds of the steroid series, which comprises acylating 3-hydroxy-20-ketimines of the pregnene series by means of a mixture of acetic anhydride and pyridine, partially hydrolyzing the reaction products by means of methanolic aqueous potassium carbonate solution, oxidizing the hydrolysis products according to the Oppenauer process to form the 3-oxo-compounds, converting said oxo-compounds to the 17,20-oxido-compounds by means of perbenzoic acid, and hydrolyzing said oxido-compounds by means of methanolic sodium hydroxide solution.

4. As a new compound $\Delta^{5,17(20)}$-pregnadiene-ol-(3)-acetylamino-(20)-acetate having the following formula:

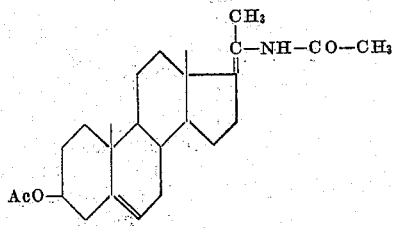

5. A process of preparing 17-($\alpha$)-hydroxy-progesterone, comprising acetylating $\Delta^5$-pregnene-ol-(3)-(20)-ketimine by means of a mixture of acetic anhydride and pyridine, partially hydrolyzing the thus obtained $\Delta^{5,17(20)}$-pregnadiene-ol-(3)-acetylamine-(20)-acetate by means of methanolic aqueous potassium carbonate solution into $\Delta^{5,17(20)}$-pregnadiene-ol-(3)-acetylamine-(20), oxidizing said hydrolysate according to Oppenauer into a compound of the formula

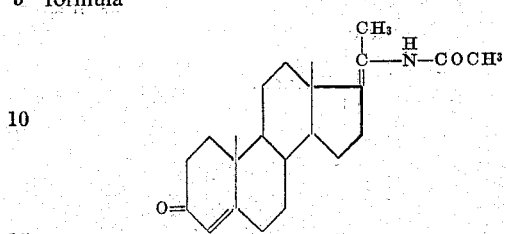

($\Delta^{4,17(20)}$-pregnadiene-one-(3)-acetylamine-(20)) converting said oxidation product by means of benzo-peracid to a compound of the formula

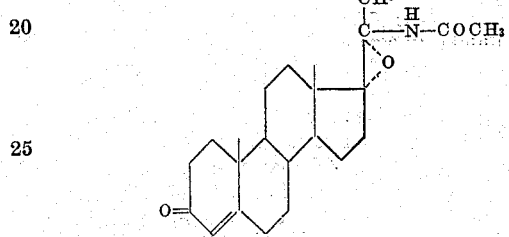

(17,20-oxido-$\Delta^4$-pregnene-one-(3)-acetylamine-(20)) and hydrolyzing said oxido-product by means of methanolic sodium hydroxide solution.

6. As a new compound the product of the following formula:

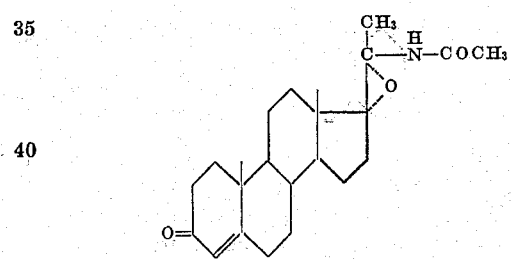

(17,20-oxido-$\Delta^4$-pregnene-one-(3)-acetylamine-(20)).

No references cited.